Aug. 18, 1964   C. L. GOLDTRAP   3,144,875
TOILET TANK SUPPLY VALVE ASSEMBLY
Original Filed Dec. 11, 1958   3 Sheets-Sheet 1

INVENTOR.
Charley L. Goldtrap,
BY
Bean, Brooks, Buckley & Bean
ATTORNEYS

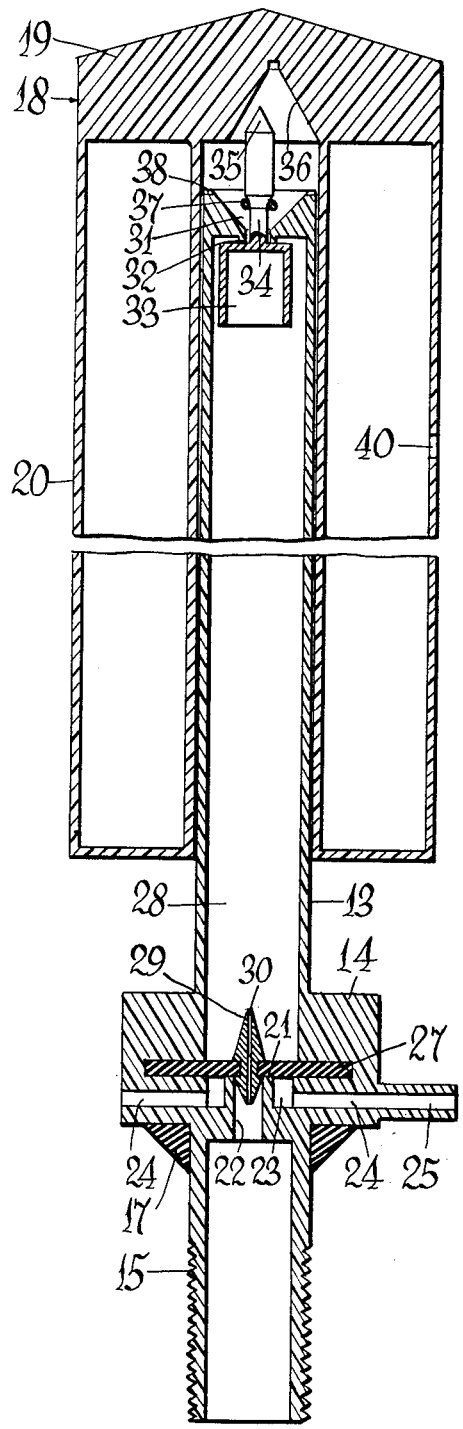
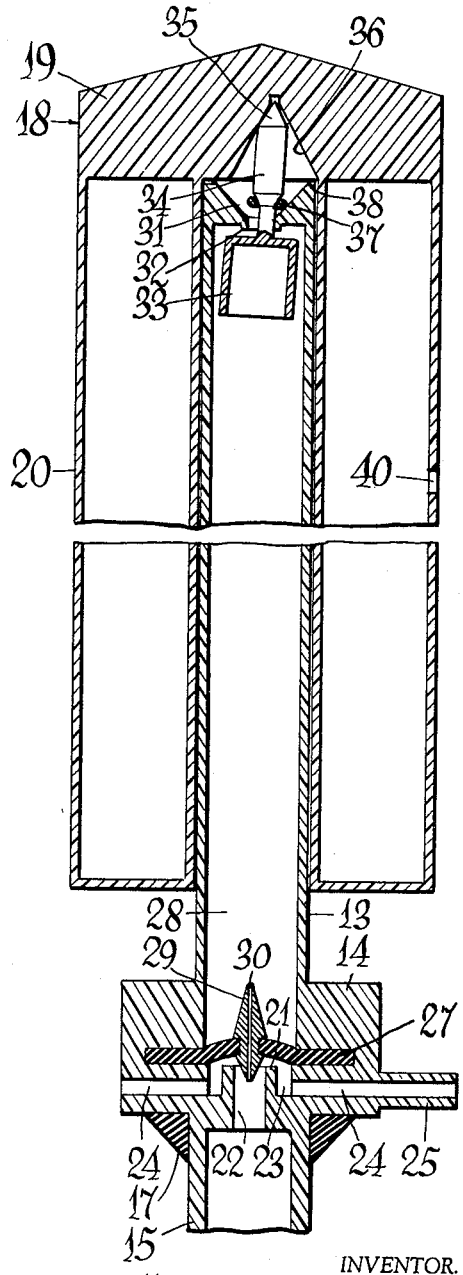

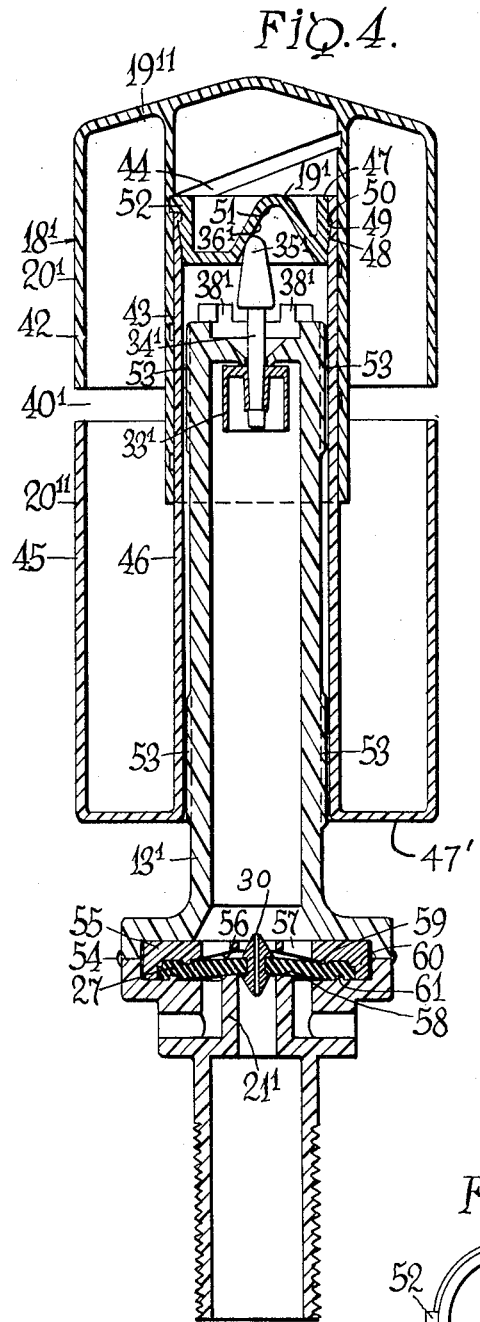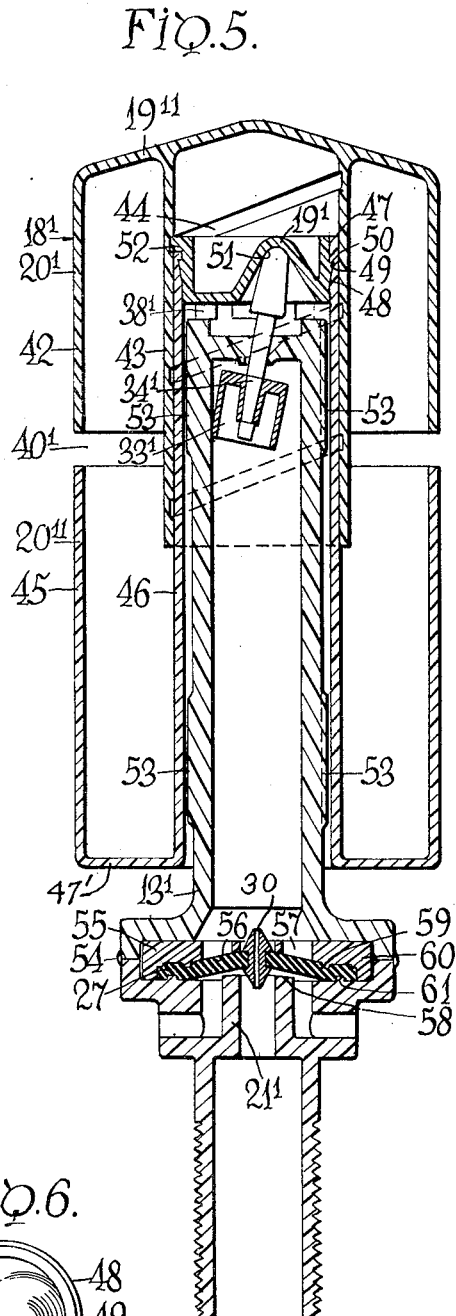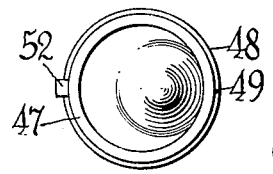

United States Patent Office 3,144,875
Patented Aug. 18, 1964

3,144,875
TOILET TANK SUPPLY VALVE ASSEMBLY
Charley L. Goldtrap, Englewood, Colo., assignor, by direct and mesne assignments, to Twentieth Century Products Corporation, Denver, Colo., a corporation of Colorado
Continuation of application Ser. No. 779,739, Dec. 11, 1958. This application Jan. 7, 1963, Ser. No. 249,954
16 Claims. (Cl. 137—414)

This invention relates generally to the plumbing art, and more specifically to a new and useful toilet tank supply valve assembly.

This application is a continuation of my application Serial No. 779,739 filed December 11, 1958, now abandoned.

It is a primary object of this invention to provide a toilet tank supply valve assembly characterized by its simplicity, and by the absence of compound lever actions and the like.

It is another object of this invention to provide the foregoing in a supply valve assembly having a positive opening and closing action utilizing the weight of water and existing water pressure to provide hydraulically balanced operation at all times.

Still another object of this invention is to provide the foregoing in a supply valve assembly which is very quiet in operation, which can be made entirely of non-corrosive materials, and which is both durable and dependable in operation.

In one aspect thereof, a toilet tank supply valve assembly constructed in accord with my invention is characterized by the provision of an inlet casing supporting a float for rising and falling relative thereto; the casing being adapted for connection to a source of water under pressure and having a first valve positioned intermediate its opposite ends and defining a pressure chamber therein, a first water outlet communicating with the casing on the side of the first valve opposite the pressure chamber, a first valve seat positioned on the same side of the first valve and associated with both the first water outlet and the first valve for engagement by the latter to close the former, a pressure equalizing orifice through the first valve into the pressure chamber whereby the latter is at all times in communication with water under source pressure, a second water outlet communicating with the pressure chamber, a second valve for closing the second water outlet, the first and second valves normally closing the first and second water outlets, respectively, and valve unseating means carried by the float and engaging the second valve as the float falls for opening the second water outlet and relieving the water pressure in the chamber thereby enabling movement of the first valve to open the first water outlet, and the second valve moving to close the second water outlet as the float rises thereby enabling the build up of pressure in the chamber to close the first valve.

In another aspect thereof, a toilet tank supply valve assembly constructed in accord with my invention is characterized by the provision of a float supported on an inlet casing for rising and falling relative thereto in response to filling and flushing, respectively, of an associated toilet tank, wherein the float comprises multiple parts adjustable one relative to another to selectively vary the water level normally maintained in the toilet tank.

The foregoing and other objects, advantages and characterizing features of a toilet tank supply valve assembly constructed in accord with my invention will become clearly apparent from the ensuing detailed description of a presently preferred embodiment thereof, taken in conjunction with the accompanying drawings wherein like reference numerals denote like parts throughout the various views and wherein:

FIG. 2 is a longitudinal sectional view of my supply valve assembly, illustrating the same in its closed position;

FIG. 3 is a similar view, but showing my supply valve assembly in open position subsequent to flushing of the toilet by dumping the water normally contained in the tank;

FIGS. 4 and 5 are views similar to those of FIGS. 2 and 3 respectively, but showing a slightly modified construction incorporating a float which is adjustable to selectively vary the water level normally maintained in the tank; and FIG. 6 is a top plan view of the bleeder valve actuator portion of the float of FIG. 4.

Figure 1:
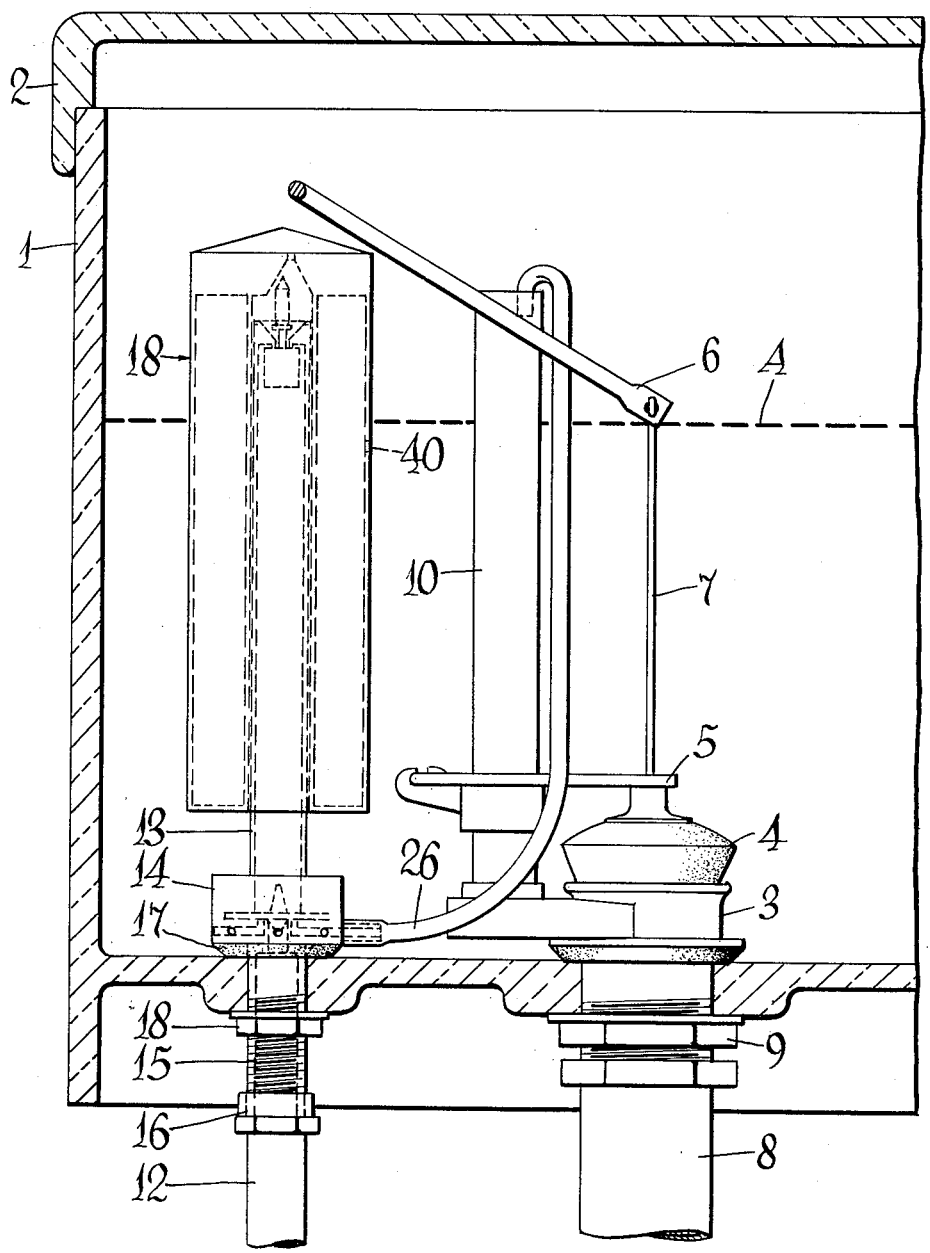
FIG. 1 is a fragmentary, sectional view of a toilet tank illustrating my new supply valve assembly operatively installed therein.

Referring now in detail to the particular embodiment illustrated in the accompanying drawings, the supply valve assembly of my invention is adapted for use in, for example, a toilet tank 1 having a top cover 2 and equipped with a flush or dump valve assembly comprising a seat 3 for a stopper ball 4, the ball 4 having a hinged guide 5 and being arranged to be lifted from the seat 3 by turning a handle, not illustrated, or the like to actuate a flush lever 6 connected to ball 4 by a member 7. Seat 3 is coupled to an outlet conduit 8 leading to the toilet bowl, not illustrated, and locked in position as by a nut 9, and an overflow pipe 10 communicates with outlet conduit 8 through valve seat 3, all in a known manner. The foregoing is of course conventional and per se no part of my invention.

The supply valve assembly of my invention is adapted to communicate with the usual tank supply line 12 leading to a source of water under pressure, not illustrated, and comprises an elongated, normally generally upright inlet casing 13 having adjacent its lower end a laterally enlarged body portion 14 and terminating therebelow in an inlet conduit portion in the form of a nipple 15 which extends through the bottom wall of tank 1. Nipple 15 is connected to supply line 12 by an appropriate coupling 16, and carries a gasket or other sealing means 17 bearing against the inner surface of the tank bottom wall to provide a water tight seal, the assembly being locked in position on the bottom wall of the tank as by a lock nut 18. The casing body portion 14 forms a shoulder for bearing against the inner bottom wall of the tank, and accommodates valve and outlet means as will be described.

Casing 13 is elongated, and in the illustrated embodiment is in the form of a hollow cylinder although it need not necessarily have such external configuration. A float member, generally designated 18, is provided, having a relatively thick top wall portion 19, for a purpose to be described, and a hollow body portion 20 of annular form. The body portion 20 is open at its center for slidingly receiving the casing 13, whereby float 18 is supported on and guided by casing 13 for rising and falling movement.

Casing 13 is provided internally thereof, adjacent body portion 14 and inlet nipple 15, with a first valve seat 21 defining an inlet passage 22, the valve seat 21 being spaced from the inner wall of casing 13 to provide a generally annular water outlet manifold passage 23 leading to a plurality of lateral outlet passages 24, one of which extends through a nipple 25 adapted to receive a conduit 26 leading to the overflow pipe 10 to fill an associated toilet bowl. A main valve is provided in the form of a diaphragm 27 secured in the enlarged body 14 of the casing and adapted to bear against the valve seat 21, as illustrated in FIG. 2, in which position it closes off inlet passage 22 from outlet passage 23. Diaphragm 27 also separates the upper portion of casing 13 from the lower, inlet portion thereof, to define a pressure chamber 28 comprising that portion of casing 13 which is above diaphragm 27. To maintain chamber 28 open at all times to source pressure, there is provided a diaphragm orifice in the form of a plug member 29 extending through diaphragm 27 and containing a restricted orifice 30, plug 29 having tapered portions on opposite sides of diaphragm 27 with the lowermost tapered portion being adapted to enter inlet passage 22 through valve seat 21 when the diaphragm valve 27 is in its closed position. Valve 27 is held against its seat 21 by the pressure of water in chamber 28 which acts on a larger effective area of diaphragm 27 than does the pressure of water in inlet passage 22.

At its upper end, casing 13 is provided with a bleed water outlet passage 31, of greater diameter than the pressure equalizing passage or orifice 30, extending through a valve seat 32 adapted to receive a float type bleed valve member 33 thereagainst.

Valve member 33 has a base in the form of an inverted cup, for better flotation, the upper surface of which is adapted to bear against the seat 32. A post 34 extends from the valve base through outlet passage 31, which still remains larger than orifice 30, to a point beyond the upper end of casing 13, terminating in a generally conical tip 35 providing a cam surface. Valve 33 therefore is adapted to float into position against its seat 32, and to be held thereagainst by the water in chamber 28.

The float member head 19 has on its under surface an inverted conical recess providing a cam surface 36 positioned off center relative to body portion 20 so as to be eccentric with respect to the cam end 35 on valve member 33. The float cam surface 36 comprises a valve actuating portion which engages the cam surface 35 of valve 33 when float 18 drops from the position of FIG. 2 to that of FIG. 3 and cants valve 33 while moving it away from valve seat 32, to open outlet passage 31. A cushioning gasket 37 is provided around the post projection 34, to bear against the upper end of casing 13, and transverse passages 38 in the form of notches or grooves are provided on the upper end surface of casing 13, so that water can pass from chamber 28 through outlet passage 31, lateral passages 38 and between casing 13 and the interior of float body 20 into tank 1, even when float 18 is in the position of FIG. 3.

In operation, assume that the water level in tank 1 is at about line A (FIG. 1). The supply valve assembly is in the position of FIG. 2, wherein valve 33 has closed the bleed outlet 31 at the top of casing 13, and valve 27 has closed the main water outlet passage 23. If the water in tank 1 is dumped, by lifting stopper ball 4, the float 18, which has water trapped therein below the level of the opening 40 in its side wall, will fall. When float 18 falls its valve actuating surface 36 is caused to bear against projection 34 of valve 33 and move the same downwardly away from valve seat 32; this opens the water bleed passage 31 permitting water within the chamber 28, which is at source pressure because of equalizing orifice 30, to escape through the outlet 31, thereby relieving the pressure within the chamber 28. Because the descending float cants valve 33, the seal between the valve and its seat is broken easily and quickly. Once the pressure in chamber 28 has been relieved diaphragm 27, comprising the main valve, will shift upwardly in response to the source pressure on its undersurface to the position illustrated in FIG. 3, permitting water to pass through inlet passage 22 into outlet manifold passage 23 and out through the main outlet passages 24, to fill the tank. As the water level rises above the top of opening 40 in float member 18, it traps air in the upper portion of the body part 20 thereof, following which the float becomes buoyant and begins to rise. After float 18 has risen a predetermined amount the valve 33, which is of light weight material having a lesser specific gravity than water and which therefore will float, is free to rise and close the bleeder outlet 31.

Once the bleeder valve 33 closes, pressure begins to build up in chamber 28, this being however a relatively slow process because of the restricted size of orifice 30. Therefore, water continues to flow through the outlets 24, to continue filling the tank and to fill the toilet bowl. By the time float 18 reaches its position of rest, illustrated in FIGS. 1 and 2, the water in chamber 28 is at substantially source pressure, and diaphragm 27 moves to closed position under the influence of gravity. Once diaphragm 27 moves to its closed position, shown in FIGS. 1 and 2, it is held thereagainst by the source pressure in chamber 28 which acts against a relatively large area of diaphragm 27 on its upper surface, in opposition to the source pressure in inlet 22, which acts against only a restricted area of the diaphragm on its undersurface. At this point, the main outlet passages 24 are closed, as well as the bleeder passage 31, and the system is at rest.

It is noted that, in addition to providing the orifice 30, the tapered plug 29 will tend to deflect debris away from orifice 30 and thereby prevent the same from becoming clogged. Also, the eccentric relation between valve 33 and the actuating surface 36 therefor accommodates rotation of the float relative to casing 13 and obviates any necessity for a sliding guide therebetween.

Where it might be desired to vary the water level normally maintained in the toilet tank, either above or below level A illustrated in FIG. 1, I provide the supply valve assembly of my invention with a float which is adjustable for this purpose. One form of such an adjustable float is illustrated at 18' in FIG. 4 wherein it is seen that, instead of the one piece construction illustrated in FIGS. 1–3, the float 18' is composed of three separate, and separable, parts comprising an air chamber portion 20' (corresponding to that part of body 20 of float 18 which is above opening 40) a water chamber portion 20" (corresponding to that portion of body 20 of float 18 which is below opening 40), and a bleeder valve actuator 19' (corresponding to the top wall 19 of float 18 with its actuator surface portion 36).

The air chamber portion 20' of float 18' is formed to provide inner and outer, concentric, annular skirt portions 42 and 43, respectively, to define an annular air chamber therebetween, with the inner skirt portion 43 extending beyond skirt 42 and having on its inner wall a helical groove 44 comprising a female thread. The air chamber portion 29' is completed by a top wall 19" thereacross.

The water chamber portion 20" comprises inner and outer, concentric, annular skirt portions 45 and 46, respectively, defining an annular water chamber therebetween and joined by a bottom wall 47'. Skirt 46 extends beyond skirt 45 in telescopic relation to the air chamber skirt 43, which latter receives the skirt 46 therein.

The actuator 19' has generally the form of a cup, with an upstanding annular side wall 47 having an upwardly and outwardly tapering portion 48 providing an upwardly facing, annular shoulder 49 therearound, between the upper and lower edges thereof. Shoulder 49 is adapted to snap-fit into a corresponding annular recess 50 in the inner wall portion of skirt 46, adjacent the upper end thereof, as clearly illustrated in FIG. 4.

Actuator 19' is formed eccentrically thereof with an upward, generally conical but rounded depression 51 providing a valve actuating surface 36' (corresponding to surface 36 in float 18), and is formed with a laterally directed lug 52 which projects generally radially beyond shoulder 49 across the upper end of skirt 46, which is notched to receive the same, into engagement with the female thread 44.

Actuator 19' is assembled to water chamber portion

20" of float 18' by inserting it into the upper end of skirt 46 until shoulder 49 snaps into recess 50, thereby locking these parts in engagement. Then, air chamber portion 20' is threaded onto the assembled water chamber portion 20" and actuator 19', with its inner skirt 43 telescopically receiving the same and with lug 52 of the actuator in screw threaded engagement with the groove or thread 44.

It will be observed from FIG. 4 that a space 40' is provided between the outer skirts 42 and 45 of the float portions 20' and 20", respectively, corresponding to opening 40 in float 18. Water normally fills the chamber portion 20" and weights the same, this being initially accomplished when the assembly is installed by temporarily holding float 18' down while the tank is filling, and in normal operation as the water in the tank rises to the upper edge of opening 40', reaching the lower edge of skirt 42, air is trapped in the air chamber portion 20' and the float thereafter becomes buoyant and rises, to close the bleed valve in the manner previously described.

However, with a float construction such as illustrated in FIG. 4, the height of opening 40' is selectively varied by simply threading air chamber portion 20' further down on water chamber portion 20" or away therefrom, to alternately lower and raise skirt 42, defining the upper edge of opening 40' relative to skirt 45 and thereby correspondingly vary the level of water normally maintained in the tank. This occurs because float 18' does not become buoyant and rise, to enable closing of bleed valve 33 and the subsequent closing of main valve 20 to stop filling of the tank, until the water level in the tank has reached the lower edge portion of skirt 42. When skirt 42 is elevated, relative to skirt 45, a higher level of water is required to render the float buoyant, and when skirt 42 is lowered, relative to skirt 45, a lower level of water is required.

Therefore, the water level normally maintained in the tank can be selectively varied to meet the requirements of different installations, and situations, providing a supply valve assembly of great flexibility, and this is a feature of considerable significance.

It will be noted that other details of the valve assembly have been slightly modified in the embodiment of FIGS. 4–6. For example, the inlet casing 13' has ribs 53 spaced therearound and extending lengthwise thereof, there being one set of, for example, four such ribs adjacent the upper end thereof and another set adjacent the lower end. These ribs act as spacers, centering float 18' on casing 13' while enabling the passage of water therebetween. Also, when float 18' falls actuator 19' is held spaced from the upper end of the inlet casing 13', to permit the passage of water thereacross, by spaced upstanding lugs 38'. In addition, the bleeder float valve 33', instead of being formed in one piece, can comprise an inverted cup 33' receiving in snap fitting relation therewith the shouldered lower end of a projecting post portion 34', which latter terminates in a rounded cam portion 35'.

Casing 13' is formed in two parts, bonded together as indicated at 54, and gasket 27 is confined in place by a spacer ring 55 having a dished under surface 56 for receiving the diaphragm thereagainst upon movement of the valve to open position, corresponding to that illustrated in FIG. 3, and formed with a number of holes 57 therethrough for the passage of water. The valve seat 21' is formed with a tapered upper edge 58 projecting slightly into the volume defined by the spacer ring 55, to insure proper seating of diaphragm 27 thereagainst when in closed position and it will be noted that the spacer ring 55 has annular, depending flange portions 59 and 60 formed to cooperate with an upstanding annular flange 61 on the lower part of inlet casing 13' and lock gasket 27 in position.

It is believed that the foregoing modifications offer certain advantages in production, but it will of course be understood that the adjustable float 18' can be provided in an assembly constructed as illustrated in FIGS. 1–3, and is not limited to use with an assembly having the further details of construction illustrated in FIGS. 4–6.

The diameter of orifice 30 is important and must be maintained, for proper functioning of the valve assembly. To this end, the conical form of the orifice member deflects debris away from the orifice so that, for example, debris carried by supply water is caused to pass through outlet passage 24 and only clear water passes through the orifice itself. Also, the member 29 can be made completely of non-corrosive material, to avoid clogging of the orifice because of corrosion.

Therefore, it is seen that my invention fully accomplishes its intended objects, and while I have disclosed and described in detail herein only certain embodiments of my invention, the same are to be considered as illustrative only and not in a limiting sense.

Having fully disclosed and completely described my invention, together with its mode of operation, what I claim as new is:

1. A toilet tank supply valve assembly comprising a normally upright water inlet casing adapted for connection to a source of water under pressure, a float member supported on said casing for rising and falling movement therealong in response to predetermined changes in the level of water in an associated tank, a first valve seat in said casing, a water inlet passage through said first valve seat, a tank filling water outlet passage through said casing, a first valve extending across the interior of said casing above said first valve seat and defining a pressure chamber in said casing above said first valve, said first valve being engageable with said first valve seat to close off said tank filling water outlet passage from said inlet passage and from said pressure chamber, a pressure equalizing passage through said first valve whereby said chamber is subject to source pressure when said first valve is engaged with said first valve seat, said first valve normally being held against said first valve seat by the pressure of water in said chamber, a bleed passage through the upper end of said casing, a second valve seat associated with said bleed passage, and a second valve within said chamber movable against said second valve seat to close said bleed passage entirely independently of said float member and normally being held against said second valve seat, said second valve being engaged by said float member upon predetermined falling movement of the latter on said casing to disengage said second valve from said second valve seat and thereby open said bleed passage, said pressure equalizing passage being of restricted size relative to said bleed passage whereby opening of the latter relieves the pressure in said chamber and thereby permits disengagement of said first valve from said first valve seat to open said water outlet passage to said inlet passage for filling an associated tank, predetermined rising movement of said float member releasing said second valve for engagement with said second valve seat to close said bleed passage and enable the build-up of pressure in said chamber for engagement of said first valve with said first valve seat, whereby filling of an associated tank is controlled by said float member through said second valve wherein said float member has a transverse wall portion in alignment with said upper end of said casing, and said second valve has a part projecting through said bleed passage for engagement by said float member wall portion to move said second valve and open said bleed passage upon predetermined falling movement of said float member on said casing, said float member wall portion having a cam surface positioned relative to said second valve part for canting said part to disengage said second valve from said second valve seat.

2. A toilet tank supply valve assembly as set forth in claim 1, wherein said first valve comprises a flexible wall across the interior of said casing immediately above said first valve seat.

3. A toilet tank supply valve assembly as set forth in claim 2, wherein said pressure equalizing passage is provided by a plug having such passage therethrough, said plug having a tapered end on the lower side of said flexible wall entering said inlet passage when said flexible wall engages said first valve seat to close said water outlet passage, said tapered end deflecting debris from said pressure equalizing passage.

4. A toilet tank supply valve assembly as set forth in claim 1, wherein said water outlet passage includes a manifold around said first valve seat.

5. A toilet tank supply valve assembly comprising a normally upright water inlet casing means adapted for connection to a source of water under pressure, a float guidingly supported on said casing means for rising and falling movements therealong in response to changes in the level of water in an associated tank, a tank filling outlet passage from said casing means, a hydraulically controlled valve controlling the flow of water through said tank filling outlet passage, and means hydraulically controlling said tank filling outlet passage valve including a bleed passage from said casing means, and a bleed valve controlling said bleed passage, said float causing said bleed valve to open said bleed passage upon falling movement of said float along said casing means and enabling said bleed valve to close said bleed passage upon rising movement of said float along said casing means, said float having a water chamber portion, an air chamber portion, and means for moving one of said portions relative to the other thereof lengthwise of said casing means to selectively vary the level of water normally maintained in an associated tank.

6. A toilet tank supply valve assembly comprising, in combination with a toilet tank adapted to hold a volume of water for flushing an associated toilet bowl, normally upright water inlet casing means adapted adjacent the lower end thereof for connection to a source of water under pressure, a float member supported on said casing means for rising and falling movement therealong in response to predetermined changes in the level of water in said tank, a first valve seat in said casing means adjacent the lower end thereof, means defining a water inlet passage through said first valve seat and main tank filling water outlet passage means through said casing means, said main water outlet passage means communicating at one end with the interior of said tank exteriorly of said casing means and communicating at its other end with the interior of said casing means at a point closely adjacent said first valve seat, first valve means extending across the interior of said casing means above said first valve seat and defining a pressure chamber in said casing means above said first valve means, said first valve means being engageable with said first valve seat to close off said other end of said main water outlet passage means from said inlet passage and from said pressure chamber, means providing a pressure equalizing passage through said first valve means in operative alignment with said first valve seat whereby said chamber is subject to source pressure when said first valve means is engaged with said first valve seat, said first valve means normally being held against said first valve seat by the pressure of water in said chamber, bleed passage means through the upper end of said casing means communicating at one end with said chamber and at the other end thereof with the interior of said tank, a second valve seat around said one end of said bleed passage means, and float valve means within said chamber movable against said second valve seat entirely independently of said float member to close said bleed passage means, said float valve means normally being held against said second valve seat by the water in said chamber, said float valve means being engaged by said float member upon predetermined falling movement of the latter on said casing means to disengage said float valve means from said second valve seat and thereby open said bleed passage means, said pressure equalizing passage being of restricted size relative to said bleed passage means whereby opening of the latter relieves the pressure in said chamber and thereby permits disengagement of said first valve means from said first valve seat to open said main water outlet passage means to said inlet passage for filling said tank, predetermined rising movement of said float member releasing said float valve means for engagement with said second valve seat to close said bleed passage means and enable the build-up of pressure in said chamber for engagement of said first valve means with said first valve seat, whereby filling of said tank is controlled by said first valve means which latter is hydraulically controlled by said float member through said float valve means, wherein said float member has a transverse wall portion in alignment with said upper end of said casing means, and said float valve means has a post projecting through said bleed passage means for engagement by said wall portion to move said float valve means and open said bleed passage means upon predetermined falling movement of said float member on its upper end, and said wall portion has a cam surface eccentrically positioned relative to said post cam surface for canting said post to disengage said float valve means from said second valve seat.

7. A toilet tank supply valve assembly as set forth in claim 5, wherein said air chamber portion and said water chamber portion each comprise inner and outer walls defining a generally annular chamber therebetween, said outer walls of said float portions normally being spaced apart lengthwise of said inlet casing means to provide an opening placing said air and water chambers in communication with the interior of an associated tank, and said inner walls of said float member portions being telescopically related to enable movement of said float portions toward and away from each other lengthwise of said inlet casing means to vary the height of said opening between said outer walls.

8. A toilet tank supply valve assembly as set forth in claim 7, wherein said water chamber inner wall is received within said air chamber inner wall, together with an actuator member carried by said water chamber inner wall for engaging said float valve means to open said bleed passage means, said actuator member having screw threaded engagement with said air chamber inner wall for holding said float member portions assembled while enabling relative positional adjustment thereof.

9. A toilet tank supply valve assembly as set forth in claim 7, wherein said water chamber inner wall is received within said air chamber inner wall, together with an actuator member carried by said water chamber inner wall for engaging said bleed valve to open said bleed passage upon predetermined falling movement of said float.

10. A toilet tank supply valve assembly as set forth in claim 9, wherein said bleed valve has a portion projecting through said bleed passage for engagement by said actuator member, said actuator member having a cam portion engaging said bleed valve portion in eccentric relation thereto and thereby canting said bleed valve to open said bleed passage.

11. A toilet tank supply valve assembly as set forth in claim 5, wherein said bleed passage extends through the upper end of said casing means and said bleed valve is positioned within said casing means and has a part projecting through said bleed passage, said float having a transverse wall portion extending crosswise of the upper end of said casing means, and said float wall portion having a cam surface canting said part to cause said bleed valve to open said bleed passage upon predetermined falling movement of said float along said casing means.

12. A toilet tank supply valve assembly comprising in combination with a toilet tank adapted to hold a volume of water for flushing an associated toilet bowl, water inlet casing means adapted adjacent one end for connection to a source of water under pressure, a float supported on said casing means for rising and falling movement thereon relative thereto in response to changes in the level of water in said tank, first valve means positioned intermediate the opposite ends of said casing means and defining a pressure chamber in said casing means between the other end thereof and said first valve means, tank filling first water outlet means communicating with the interior of said tank and with said casing means on the same side of said first valve means as said one end of said casing means, first valve seat means on the same side of said first valve means as said one end of said casing means, said first valve seat means being associated with said first water outlet means and with said first valve means for engagement by the latter to close said first water outlet means, means providing a pressure equalizing orifice through said first valve means into said pressure chamber open to water at source pressure at both open and closed positions of said first valve means relative to said first valve seat means, second water outlet means communicating with the interior of said tank and with said pressure chamber adjacent said other end of said casing means, second valve seat means associated with said second water outlet means, second valve means movable into engagement with said second valve seat means to close said second water outlet means, said second valve means normally engaging said second valve seat means to close said second water outlet means and enable water pressure in said pressure chamber to build up to source pressure, and valve unseating means carried by said float engaging said second valve means upon falling movement of said float and disengaging the same from said second valve seat means to open said second water outlet means and thereby relieve the water pressure in said pressure chamber, said first valve means being held in engagement with said first valve seat means to close said first water outlet means when the water in said chamber is at substantially source pressure and being disengaged from said first valve seat means to open said first water outlet means when the pressure of the water in said chamber is relieved by opening said second water outlet means, rising movement of said float enabling said second valve means to engage said second valve seat means and close said second water outlet means, whereby filling of said tank is controlled by said first valve means which latter is hydraulically controlled by said float through said second valve means, said float incorporating means adjustable to selectively vary the water level normally maintained in said tank to an infinite number of positions between finite limits.

13. A toilet tank supply valve assembly comprising, in combination with a toilet tank adapted to hold a volume of water for flushing an associated toilet bowl, normally upright water inlet casing means adapted adjacent the lower end thereof for connection to a source of water under pressure, a float member supported on said casing means for rising and falling movement therealong in response to predetermined changes in the level of water in said tank, a first valve seat in said casing means adjacent the lower end thereof, means defining a water inlet passage through said first valve seat and main water outlet passage means through said casing means, said main water outlet passage means communicating at one end with the interior of said tank exteriorly of said casing means and communicating at its other end with the interior of said casing means at a point closely adjacent said first valve seat, first valve means extending across the interior of said casing means above said first valve seat and defining a pressure chamber in said casing means above said first valve means, said first valve means being engageable with said first valve seat to close off said other end of said main water outlet passage means from said inlet passage and from said pressure chamber, means providing a pressure equalizing passage through said first valve means in operative alignment with said first valve seat whereby said chamber is subject to source pressure when said first valve means is engaged with said first valve seat, said first valve means normally being held against said first valve seat by the pressure of water in said chamber, bleed passage means through the upper end of said casing means communicating at one end with said chamber and at the other end thereof with the interior of said tank, a second valve seat around said one end of said bleed passage means, and float valve means within said chamber movable against said second valve seat to close said bleed passage means, said float valve means normally being held against said second valve seat by the water in said chamber, said float valve means being engageable by said float member upon predetermined falling movement of the latter on said casing means to disengage said float valve means from said second valve seat and thereby open said bleed passage means, said pressure equalizing passage being of restricted size relative to said bleed passage means whereby opening of the latter relieves the pressure in said chamber and permits disengagement of said first valve means from said first valve seat to open said main water outlet passage means to said inlet passage for filling said tank, predetermined rising movement of said float member releasing said float valve means for engagement with said second valve seat to close said bleed passage means and enable the build-up of pressure in said chamber, said float chamber comprising a water chamber portion, an air chamber portion, and means for telescopically adjusting the position of said portions relative to each other to selectively vary the level of water normally maintained in said tank.

14. A toilet tank supply valve assembly comprising a normally upright water inlet casing adapted for connection to a source of water under pressure, a float member supported on said casing for rising and falling movement therealong in response to predetermined changes in the level of water in an associated tank, a water inlet passage into said casing, a tank filling water outlet passage from said casing, a first valve defining a pressure chamber in said casing, said first valve being movable to a closed position closing off said tank filling water outlet passage from said inlet passage and from said pressure chamber, a pressure equalizing passage placing said chamber in communication with said inlet passage whereby said chamber is subject to inlet pressure when said first valve is in said closed position, said first valve normally being held in said closed position by the pressure of water in said chamber, a bleed passage from said chamber, a second valve normally closing said bleed passage, said second valve having a part projecting therefrom for engagement by said float member and said float member canting said part upon predetermined falling movement of said float member on said casing to open said bleed passage, said pressure equalizing passage being of restricted size relative to said bleed passage whereby opening of the latter relieves the pressure in said chamber for movement of said first valve out of said closed position to open said water outlet passage to said inlet passage for filling an associated tank, said second valve closing said bleed passage upon predetermined rising movement of said float member to enable the buildup of pressure in said chamber for movement of said first valve to said closed position, whereby filling of an associated tank is controlled by said first valve which latter is hydraulically controlled by said float member through said second valve.

15. A toilet tank supply valve assembly comprising a normally upright water inlet casing adapted for connection to a source of water under pressure, a float member supported on said casing for rising and falling movement therealong in response to predetermined changes in the level of water in an associated tank, a water inlet passage into said casing, a tank filling water outlet passage from said casing, a first valve defining a pressure chamber in said casing, said first valve being movable to a closed position closing off said tank filling water outlet passage from said inlet passage and from said pressure chamber, a pressure equalizing passage placing said chamber in communication with said inlet passage whereby said chamber is subject to inlet pressure when said first valve is in said closed position, said first valve normally being held in said closed position by the pressure of water in said chamber, a bleed passage from said chamber, a second valve normally closing said bleed passage, said float member canting said second valve to open said bleed passage upon predetermined falling movement of said float member on said casing, said pressure equalizing passage being of restricted size relative to said bleed passage whereby opening of the latter relieves the pressure in said chamber for movement of said first valve out of said closed position to open said water outlet passage to said inlet passage for filling an associated tank, said second valve closing said bleed passage upon predetermined rising movement of said float member to enable the buildup of pressure in said chamber for movement of said first valve to said closed position, whereby filling of an associated tank is controlled by said first valve which latter is hydraulically controlled by said float member through said second valve.

16. A toilet tank supply valve assembly comprising a normally upright casing, a float member supported on said casing for rising and falling movement therealong in response to predetermined changes in the level of water in an associated tank, a water inlet passage to said casing, a tank filling water outlet passage from said casing, a first valve defining a pressure chamber in said casing, said first valve being movable to a closed position closing off said tank filling water outlet passage from said inlet passage and from said pressure chamber, a pressure equalizing passage placing said chamber in communication with said inlet passage whereby said chamber is subject to inlet pressure when said first valve is in said closed position, said first valve normally being held in said closed position by the pressure of water in said chamber, a bleed passage from said chamber, a second valve normally closing said bleed passage, means canting said second valve to open said bleed passage upon predetermined falling movement of said float member on said casing, said pressure equalizing passage being of restricted size relative to said bleed passage whereby opening of the latter relieves the pressure in said chamber for movement of said first valve out of said closed position to open said water outlet passage to said inlet passage for filling an associated tank, said second valve closing said bleed passage upon predetermined rising movement of said float member on said casing to enable the buildup of pressure in said chamber for movement of said first valve to said closed position, whereby filling of an associated tank is controlled by said first valve which latter is hydraulically controlled by said float member through said second valve.

References Cited in the file of this patent
UNITED STATES PATENTS

| | | |
|---|---|---|
| 1,577,145 | Osborn | Mar. 16, 1926 |
| 1,626,289 | Langdon | Apr. 26, 1927 |
| 2,318,236 | Layton | May 4, 1943 |
| 2,608,990 | Crockett | Sept. 2, 1952 |
| 2,678,058 | Richardson | May 11, 1954 |
| 2,730,122 | Svirsky | Jan. 10, 1956 |
| 2,744,536 | Buckner | May 8, 1956 |
| 2,784,733 | Martinez | Mar. 12, 1957 |
| 2,808,850 | Doyle | Oct. 8, 1957 |
| 2,809,656 | Goldtrap | Oct. 15, 1957 |
| 3,049,010 | Holderith | Aug. 14, 1962 |

FOREIGN PATENTS

| | | |
|---|---|---|
| 153,027 | Australia | Aug. 31, 1953 |